(12) United States Patent
Xie et al.

(10) Patent No.: US 11,237,252 B2
(45) Date of Patent: Feb. 1, 2022

(54) DETECTION APPARATUS, DETECTION SYSTEM, DETECTION METHOD, AND MOVABLE DEVICE

(71) Applicant: SZ DJI TECHNOLOGY CO., LTD., Shenzhen (CN)

(72) Inventors: Jiebin Xie, Shenzhen (CN); Wei Ren, Shenzhen (CN); Weisi Ma, Shenzhen (CN); Guyue Zhou, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 201 days.

(21) Appl. No.: 15/885,174

(22) Filed: Jan. 31, 2018

(65) Prior Publication Data
US 2018/0156897 A1 Jun. 7, 2018

Related U.S. Application Data

(63) Continuation of application No. PCT/CN2015/085783, filed on Jul. 31, 2015.

(51) Int. Cl.
*G01S 7/481* (2006.01)
*G01S 17/89* (2020.01)
*G01S 17/42* (2006.01)
*G01S 17/933* (2020.01)

(52) U.S. Cl.
CPC ............ *G01S 7/4817* (2013.01); *G01S 17/42* (2013.01); *G01S 17/89* (2013.01); *G01S 17/933* (2013.01)

(58) Field of Classification Search
None
See application file for complete search history.

(56) References Cited

U.S. PATENT DOCUMENTS

| | | | | |
|---|---|---|---|---|
| 5,110,065 A | * | 5/1992 | Cawelti | B65H 54/2878 242/478.2 |
| 5,247,172 A | * | 9/1993 | Riemer | G01D 5/06 250/227.21 |
| 5,644,141 A | * | 7/1997 | Hooker | G01B 11/024 250/205 |
| 6,057,909 A | * | 5/2000 | Yahav | G02B 7/32 356/5.04 |

(Continued)

FOREIGN PATENT DOCUMENTS

| | | |
|---|---|---|
| CN | 101493526 A | 7/2009 |
| CN | 102360079 A | 2/2012 |

(Continued)

OTHER PUBLICATIONS

The World Intellectual Property Organization (WIPO) International Search Report and Written Opinion for PCT/CN2015/085783 dated Apr. 28, 2016 11 Pages.

*Primary Examiner* — Yuqing Xiao
*Assistant Examiner* — Amir J Askarian
(74) *Attorney, Agent, or Firm* — Anova Law Group, PLLC

(57) ABSTRACT

A detection apparatus includes an emission component, a receiver, and a controller electrically connected with the emission component and the receiver. The emission component includes an emitter configured to emit a signal, a reflector disposed in proximity to the emitter and configured to reflect the signal emitted by the emitter, and a driver connected to the reflector. The controller is configured to control the driver to drive the reflector to rotate.

16 Claims, 5 Drawing Sheets

(56) References Cited

U.S. PATENT DOCUMENTS

| | | | |
|---|---|---|---|
| 6,205,243 B1* | 3/2001 | Migdal | G01B 11/2518 382/154 |
| 6,246,468 B1* | 6/2001 | Dimsdale | G01B 11/002 356/4.02 |
| 6,388,789 B1* | 5/2002 | Bernstein | B81B 3/0021 359/198.1 |
| 7,583,364 B1* | 9/2009 | Mayor | G01N 21/538 356/4.01 |
| 8,203,703 B1* | 6/2012 | Kane | G01C 1/00 356/141.5 |
| 8,472,701 B2* | 6/2013 | Yokoi | G01B 11/25 382/154 |
| 8,752,969 B1* | 6/2014 | Kane | G02B 7/1821 359/872 |
| 8,958,057 B2 | 2/2015 | Kane et al. | |
| 10,000,000 B2* | 6/2018 | Marron | G01S 7/4863 |
| 2002/0158873 A1* | 10/2002 | Williamson | G06T 17/00 345/427 |
| 2003/0138020 A1* | 7/2003 | Chen | G02B 3/0068 372/75 |
| 2004/0012770 A1* | 1/2004 | Stierle | G01B 13/20 356/4.01 |
| 2006/0262324 A1* | 11/2006 | Hays | G01S 17/89 356/519 |
| 2008/0170238 A1* | 7/2008 | Ochi | G01B 11/25 356/610 |
| 2009/0051899 A1* | 2/2009 | Harlander | G01J 3/453 356/51 |
| 2009/0195769 A1* | 8/2009 | Luo | G01S 17/34 356/4.01 |
| 2010/0110431 A1* | 5/2010 | Ray | B64D 15/20 356/342 |
| 2010/0165322 A1 | 7/2010 | Kane et al. | |
| 2010/0271615 A1* | 10/2010 | Sebastian | G06T 7/246 356/4.01 |
| 2011/0019188 A1* | 1/2011 | Ray | B64D 15/20 356/342 |
| 2011/0164783 A1* | 7/2011 | Hays | G01S 17/003 382/100 |
| 2011/0188121 A1* | 8/2011 | Goring | G02B 7/1805 359/601 |
| 2011/0297832 A1* | 12/2011 | Yao | H05K 1/183 250/353 |
| 2012/0133917 A1* | 5/2012 | Tiefenthaler | G01C 3/08 356/4.01 |
| 2012/0274938 A1* | 11/2012 | Ray | B64D 15/20 356/342 |
| 2013/0176305 A1* | 7/2013 | Ito | G01C 15/002 345/420 |
| 2013/0182077 A1* | 7/2013 | Holz | H04N 5/232 348/46 |
| 2013/0206967 A1* | 8/2013 | Shpunt | G06T 15/00 250/216 |
| 2013/0308117 A1* | 11/2013 | Bridges | G01B 21/045 356/3.09 |
| 2014/0049769 A1* | 2/2014 | Zheleznyak | G06K 9/00255 356/28 |
| 2014/0133152 A1* | 5/2014 | Buehler | F41G 3/145 362/259 |
| 2014/0317790 A1* | 10/2014 | Labuda | G01Q 60/38 850/6 |
| 2015/0219767 A1* | 8/2015 | Humphreys | G01S 19/48 342/357.26 |
| 2015/0316376 A1* | 11/2015 | Williams | G01C 19/48 74/5.6 A |
| 2016/0003944 A1* | 1/2016 | Schmidtke | G01S 7/497 356/4.07 |
| 2016/0070265 A1* | 3/2016 | Liu | G01C 21/00 701/3 |
| 2016/0096474 A1* | 4/2016 | Sakai | G01S 7/4815 340/435 |
| 2016/0146938 A1* | 5/2016 | Becker | G01S 17/04 250/208.2 |
| 2016/0223653 A1* | 8/2016 | Hutson | G01S 17/42 |
| 2016/0274222 A1* | 9/2016 | Yeun | G01S 7/4817 |
| 2016/0282453 A1* | 9/2016 | Pennecot | G01S 7/4972 |
| 2016/0376000 A1* | 12/2016 | Kohstall | B64C 37/00 114/313 |
| 2017/0201614 A1* | 7/2017 | Deng | G06F 16/217 |
| 2018/0267294 A1* | 9/2018 | Aschwanden | G02B 7/1821 |

FOREIGN PATENT DOCUMENTS

| | | | |
|---|---|---|---|
| CN | 102393516 A | | 3/2012 |
| CN | 102508259 A | | 6/2012 |
| CN | 102607512 A | | 7/2012 |
| CN | 103119463 A | | 5/2013 |
| CN | 104793214 A | | 7/2015 |
| FR | 2712704 B1 | | 2/1996 |
| JP | 07271435 A | * | 1/1995 |
| JP | 10145128 A | * | 5/1998 |
| JP | 11295020 A | * | 1/1999 |
| JP | 2007155541 A | | 6/2007 |

* cited by examiner

DETECTION APPARATUS, DETECTION SYSTEM, DETECTION METHOD, AND MOVABLE DEVICE

CROSS-REFERENCE TO RELATED APPLICATION

This application is a continuation application of International Application No. PCT/CN2015/085783, filed on Jul. 31, 2015, the entire contents of which are incorporated herein by reference.

TECHNICAL FIELD

The present disclosure relates to a detection apparatus, a detection system, a detection method and a movable device using the detection apparatus.

BACKGROUND OF THE DISCLOSURE

Lidars emit reliable and stable laser signals and therefore are generally used as distance measuring sensors or obstacle detectors. However, a laser emission angle of lidar is small, resulting in a small detection range covered by the emitted laser signal in distance measurement or obstacle detection.

SUMMARY OF THE DISCLOSURE

There is a need for a detection apparatus, a detection system, a detection method which have a larger detection range, and a movable device using the detection apparatus.

An aspect of the present disclosure discloses a detection apparatus comprising a controller, an emission component and a receiver. The receiver and the emission component can be electrically connected with the controller. The emission component can comprise an emitter, a driver and a reflector, the reflector being connected to the driver and disposed in proximity to the emitter. The controller can control the driver to drive a rotation of the reflector such that signal emitted from the emitter can be reflected by the reflector toward a plurality of directions.

In some embodiments, the emitter can be a laser emitter. The signal can be a laser signal.

In some embodiments, the emitter can comprise an emission head.

In some embodiments, the emitter can further comprise an emission lens connected to the emission head.

In some embodiments, the emission head can be a laser emission head. The emission lens can be a collimating lens.

In some embodiments, the driver can be a micro-electro-mechanical system (MEMS) driver.

In some embodiments, the driver can be provided with a micro-actuator to which the reflector is connected. The micro-actuator can drive the reflector to rotate about at least one axis by a predetermined angle.

In some embodiments, the at least one axis can comprise a first axis and a second axis intersecting the first axis. The micro-actuator can drive the reflector to rotate about the first axis and/or the second axis by a predetermined angle.

In some embodiments, the first axis and the second axis can be provided perpendicular to each other.

In some embodiments, the at least one axis can comprise a first axis, a second axis and a third axis intersecting with one another.

In some embodiments, the first axis, the second axis and the third axis can be provided perpendicular to one another.

In some embodiments, the receiver can comprise a photodiode, the photodiode receiving a reflected signal which is the signal emitted from the emission component being reflected by an obstacle and converting the reflected signal into an electrical signal.

In some embodiments, the receiver can further comprise a receiving lens disposed on the photodiode.

In some embodiments, the detection apparatus can further comprise a modulator which can perform an amplitude modulation on the signal emitted from the emitter.

Another aspect of the disclosure discloses a detection system implemented on a detection apparatus, the detection apparatus comprising a controller, an emission component and a receiver. The emission component can comprise an emitter, a driver and a reflector, the reflector being connected to the driver and disposed in proximity to the emitter. The detection system can comprise: an emission control module for controlling the emitter to emit a signal; and a driving module for controlling the driver to drive a rotation of the reflector, such that the signal emitted from the emitter can be reflected by the reflector toward a plurality of directions.

In some embodiments, the detection system can further comprise a receiving module for controlling the receiver to receive a reflected signal which is the signal emitted from the emission component being reflected by an obstacle, such that the controller can calculate a position of the obstacle relative to the detection apparatus based upon the reflected signal.

In some embodiments, the detection system can further comprise a calculation module for calculating a distance between the obstacle and the detection apparatus based upon a time of emitting the emitted signal and a time of receiving the reflected signal.

In some embodiments, the detection system can further comprise a calculation module for calculating a distance between the obstacle and the detection apparatus based upon a phase difference between the emitted signal and reflected signal.

In some embodiments, the emitter can comprise an emission head. The emission control module can control the emission head to emit the signal. The signal can be a laser signal.

In some embodiments, the emission control module can control the emission head to emit the signal toward the reflector. The driving module can control the driver to drive the reflector to rotate a predetermined angle, such that the signal is reflected toward the plurality of directions.

In some embodiments, the calculation module can calculate the position of the obstacle relative to the detection apparatus based upon the rotational angle of the reflector and a time of receiving the reflected signal.

Another aspect of the disclosure discloses a detection method performed by a detection apparatus, the detection apparatus comprising a controller and an emission component, the emission component comprising an emitter, a driver, and a reflector. The reflector can be connected to the driver and disposed in proximity to the emitter, and the controller can control the driver to drive a rotation of the reflector. The detection method can comprise: controlling the emitter to emit a signal; and controlling the driver to drive the rotation of the reflector, such that the signal emitted from the emitter can be reflected toward a plurality of directions.

In some embodiments, the detection apparatus can further comprise a receiver. The method can further comprise, after the signal being reflected by the reflector toward a plurality of directions, controlling the receiver to receive a reflected signal which is the signal emitted from the emitter being reflected by an obstacle, and controlling the controller to calculate a position of the obstacle relative to the detection apparatus based upon the reflected signal.

In some embodiments, calculating the position of the obstacle relative to the detection apparatus can comprise calculating a distance between the obstacle and the detection apparatus based upon a time of emitting the emitted signal and a time of receiving the reflected signal.

In some embodiments, calculating the position of the obstacle relative to the detection apparatus can comprise calculating a distance between the obstacle and the detection apparatus based upon a phase difference between the emitted signal and the reflected signal.

In some embodiments, calculating the position of the obstacle relative to the detection apparatus can comprise calculating the position of the obstacle relative to the detection apparatus based upon the rotational angle of the emitter and the distance between the obstacle and the detection apparatus.

In some embodiments, the emitter can be a laser emitter. The signal can be a laser signal when the emitter is controlled to emit the signal.

In some embodiments, controlling the driver to drive the rotation of the reflector can comprise controlling the driver to drive the reflector to rotate about at least one axis by a predetermined angle.

In some embodiments, the at least one axis can comprise a first axis and a second axis intersecting the first axis. Controlling the driver to drive the rotation of the reflector can comprise controlling the driver to drive the reflector to rotate about the first axis and/or the second axis by the predetermined angle.

In some embodiments, the first axis and the second axis can be provided perpendicular to each other.

In some embodiments, the at least one axis can comprise a first axis, a second axis and a third axis intersecting with one another.

In some embodiments, the first axis, the second axis and the third axis can be provided perpendicular to one another.

Another aspect of the disclosure discloses a movable device comprising a device body and a detection apparatus carried on the device body, the detection apparatus comprising an emission component and a receiver. The emission component can comprise an emitter, a driver, and a reflector, the reflector being connected to the driver and disposed in proximity to the emitter. The driver can drive a rotation of the reflector such that signal emitted from the emitter can be reflected by the reflector toward a plurality of directions.

In some embodiments, the emitter can be a laser emitter. The signal can be a laser signal.

In some embodiments, the emitter can comprise an emission head.

In some embodiments, the emitter can further comprise an emission lens connected to the emission head.

In some embodiments, the emission head can be a laser emission head. The emission lens can be a collimating lens.

In some embodiments, the driver can be a micro-electromechanical system (MEMS) driver.

In some embodiments, the driver can be provided with a micro-actuator to which the reflector can be connected. The micro-actuator can drive the reflector to rotate about at least one axis by a predetermined angle.

In some embodiments, the at least one axis can comprise a first axis, a second axis and a third axis intersecting with one another.

In some embodiments, the first axis, the second axis and the third axis can be provided perpendicular to one another.

In some embodiments, the at least one axis can comprise a first axis and a second axis intersecting first axis. The micro-actuator can drive the reflector to rotate about the first axis and/or the second axis by the predetermined angle.

In some embodiments, the first axis and the second axis can be provided perpendicular to each other.

In some embodiments, the movable device can be provided with a driving member. The detection apparatus can be carried on the driving member and driven by the driving member to rotate relative to the device body.

In some embodiments, the driving member can be a motor.

In some embodiments, the driving member can comprise a body and a mounting member rotatably provided on the body, the detection apparatus being provided on the mounting member. The detection apparatus can be driven by the mounting member to rotate about a third axis.

In some embodiments, the third axis can be not parallel to the first axis or the second axis.

In some embodiments, the first axis, the second axis and the third axis can be provided perpendicular to one another.

In some embodiments, the receiver can comprise a photodiode which can receive a reflected signal, which can be the signal emitted from the emission component being reflected by an obstacle, and convert the reflected signal into an electrical signal.

In some embodiments, the receiver can further comprise a receiving lens disposed on the photodiode.

In some embodiments, the detection apparatus can further comprise a modulator which can perform an amplitude modulation on the signal emitted from the emitter.

In some embodiments, the movable device can further comprise an inertial measurement system which can detect an attitude of the movable device.

In some embodiments, the detection apparatus can further comprise a controller, the receiver and the emission component being electrically connected to the controller. The controller can calculate a position of an obstacle relative to the movable device based upon the signal emitted from the emission component and a reflected signal which can be the signal emitted from the emission component being reflected by the obstacle.

In some embodiments, the movable device can further comprise an autonomous positioning system which, after the position of the obstacle relative to the movable device is calculated by the controller, can determine a spatial position of the movable device within a surrounding environment using a simultaneous localization and mapping (SLAM) algorithm in combination with current attitude of the movable device measured by the inertial measurement system.

Another aspect of the disclosure discloses a detection apparatus comprising a controller, an emission component and a receiver, the receiver and the emission component being electrically connected with the controller. The emission component can comprise a driver and an emitter connected to the driver. The controller can control the driver to drive a rotation of the emitter. The emitter can be driven by the driver to emit signal toward a plurality of directions.

In some embodiments, the emitter can be a laser emitter. The signal can be a laser signal.

In some embodiments, the emitter can comprise an emission head provided on the driver.

In some embodiments, the emitter can further comprise an emission lens connected to the emission head.

In some embodiments, the emission head can be a laser emission head. The emission lens can be a collimating lens.

In some embodiments, the driver can be a micro-electromechanical system (MEMS) driver.

In some embodiments, the driver can be provided with a micro-actuator to which the emitter is connected. The micro-actuator can drive the emitter to rotate about at least one axis by a predetermined angle.

In some embodiments, the at least one axis can comprise a first axis and a second axis intersecting the first axis. The micro-actuator can drive the emitter to rotate about the first axis and/or the second axis by the predetermined angle.

In some embodiments, the first axis and the second axis can be provided perpendicular to each other.

In some embodiments, the at least one axis can comprise a first axis, a second axis and a third axis intersecting with one another.

In some embodiments, the first axis, the second axis and the third axis can be provided perpendicular to one another.

In some embodiments, the receiver can comprise a photodiode which can receive a reflected signal, which can be the signal emitted from the emitter being reflected by an obstacle, and convert the reflected signal into an electrical signal.

In some embodiments, the receiver can further comprise a receiving lens disposed on the photodiode.

In some embodiments, the detection apparatus can further comprise a modulator which can perform an amplitude modulation on the signal emitted from the emitter.

Another aspect of the disclosure discloses a movable device comprising a device body and a detection apparatus carried on the device body, the detection apparatus comprising an emission component and a receiver. The emission component can comprise a driver and an emitter connected to the driver. The driver can drive a rotation of the emitter. The emitter can be driven by the driver to emit signal toward a plurality of directions.

In some embodiments, the emitter can be a laser emitter. The signal can be a laser signal.

In some embodiments, the emitter can comprise an emission head provided on the driver.

In some embodiments, the emitter can further comprise an emission lens connected to the emission head.

In some embodiments, the emission head can be a laser emission head. The emission lens can be a collimating lens.

In some embodiments, the driver can be a micro-electromechanical system (MEMS) driver.

In some embodiments, the driver can be provided with a micro-actuator to which the emitter is connected. The micro-actuator can drive the emitter to rotate about at least one axis by a predetermined angle.

In some embodiments, the at least one axis can comprise a first axis, a second axis and a third axis intersecting with one another.

In some embodiments, the first axis, the second axis and the third axis can be provided perpendicular to one another.

In some embodiments, the at least one axis can comprise a first axis and a second axis intersecting the first axis. The micro-actuator can drive the emitter to rotate about the first axis and/or the second axis by the predetermined angle.

In some embodiments, the first axis and the second axis can be provided perpendicular to each other.

In some embodiments, the movable device can be provided with a driving member. The detection apparatus can be carried on the driving member and driven by the driving member to rotate relative to the device body.

In some embodiments, the driving member can be a motor.

In some embodiments, the driving member can comprise a body and a mounting member rotatably provided on the body, the detection apparatus being provided on the mounting member. The detection apparatus can be driven by the mounting member to rotate about a third axis.

In some embodiments, the third axis can be not parallel to the first axis or the second axis.

In some embodiments, the first axis, the second axis and the third axis can be provided perpendicular to one another.

In some embodiments, the receiver can comprise a photodiode which can receive a reflected signal, which can be the signal emitted from the emitter being reflected by an obstacle, and convert the reflected signal into an electrical signal.

In some embodiments, the receiver can further comprise a receiving lens disposed on the photodiode.

In some embodiments, the detection apparatus can further comprise a modulator which can perform an amplitude modulation on the signal emitted from the emitter.

In some embodiments, the movable device can further comprise an inertial measurement system which can detect an attitude of the movable device.

In some embodiments, the detection apparatus can further comprise a controller, the receiver and the emission component being electrically connected to the controller. The controller can calculate a position of an obstacle relative to the movable device based upon the signal emitted from the emission component and a reflected signal which can be the signal emitted from the emission component being reflected by the obstacle.

In some embodiments, the movable device can further comprise an autonomous positioning system which, after the position of the obstacle relative to the movable device is calculated by the controller, can determine a spatial position of the movable device within a surrounding environment using a simultaneous localization and mapping (SLAM) algorithm in combination with a current attitude of the movable device measured by the inertial measurement system.

Another aspect of the disclosure discloses a detection method performed by a detection apparatus. The detection apparatus can comprise a controller and an emission component, the emission component comprising a driver and an emitter connected to the driver, the controller controlling the driver to drive a rotation of the emitter. The detection method can comprise: controlling the emitter to emit a signal; and controlling the driver to drive the rotation of the emitter, such that the signal emitted from the emitter can be emitted toward a plurality of directions.

In some embodiments, the detection apparatus can further comprise a receiver. The method can further comprise, after the signal being emitted toward a plurality of directions, controlling the receiver to receive a reflected signal which is the signal emitted from the emitter being reflected by an obstacle, and controlling the controller to calculate a position of the obstacle relative to the detection apparatus based upon the reflected signal.

In some embodiments, calculating the position of the obstacle relative to the detection apparatus can comprise calculating a distance between the obstacle and the detection apparatus based upon a time of emitting the emitted signal and a time of receiving the reflected signal.

In some embodiments, calculating the position of the obstacle relative to the detection apparatus can comprise calculating a distance between the obstacle and the detection apparatus based upon a phase difference between the emitted signal and reflected signal.

In some embodiments, calculating the position of the obstacle relative to the detection apparatus can comprise calculating the position of the obstacle relative to the detection apparatus based upon the rotational angle of the emitter and the distance between the obstacle and the detection apparatus.

In some embodiments, the emitter can be a laser emitter. The signal can be a laser signal when the emitter is controlled to emit the signal.

In some embodiments, controlling the driver to drive the rotation of the emitter can comprise controlling the driver to drive the emitter to rotate about at least one axis by a predetermined angle.

In some embodiments, the at least one axis can comprise a first axis and a second axis intersecting the first axis. Controlling the driver to drive the rotation of the emitter can comprise controlling the driver to drive the emitter to rotate about the first axis and/or the second axis by the predetermined angle.

In some embodiments, the first axis and the second axis can be provided perpendicular to each other.

In some embodiments, the at least one axis can comprise a first axis, a second axis and a third axis intersecting with one another.

In some embodiments, the first axis, the second axis and the additional axis can be provided perpendicular to one another.

Another aspect of the disclosure discloses a detection system implemented on a detection apparatus, the detection apparatus comprising a controller, an emission component and a receiver, the emission component comprising a driver and an emitter connected to the driver. The detection system can comprise: an emission control module for controlling the emitter to emit a signal; and a driving module for controlling the driver to drive a rotation of the emitter, such that the signal emitted from the emitter can be emitted toward a plurality of directions.

In some embodiments, the detection system can further comprise a receiving module for controlling the receiver to receive a reflected signal which can be the signal emitted from the emitter being reflected by an obstacle, such that the controller can calculate a position of the obstacle relative to the detection apparatus based upon the reflected signal.

In some embodiments, the detection system can further comprise a calculation module for calculating a distance between the obstacle and the detection apparatus based upon a time of emitting the emitted signal and a time of receiving the reflected signal.

In some embodiments, the detection system can further comprise a calculation module for calculating a distance between the obstacle and the detection apparatus based upon a phase difference between the emitted signal and reflected signal.

In some embodiments, the emitter can comprise an emission head. The emission control module can control the emission head to emit the signal. The signal can be a laser signal.

In some embodiments, the emission control module can control the emission head to emit the signal toward the emitter. The driving module can control the driver to drive the emitter to rotate by a predetermined angle, such that the signal can be emitted toward the plurality of directions.

In some embodiments, the calculation module can calculate the position of the obstacle relative to the detection apparatus based upon a rotational angle of the emitter and a time of receiving the reflected signal.

The detection apparatus of the disclosure can send signal emitted from the emitter toward a plurality of directions around the detection apparatus by driving a rotation of the reflector using the driver, thereby allowing a wide detection coverage of the detection apparatus.

LIST OF REFERENCE NUMERALS

TABLE 1

| Detection apparatus | 100 |
| --- | --- |
| Controller | 10 |
| Emission component | 30 |
| Emitter | 32 |
| Emission head | 321 |
| Emission lens | 323 |
| Driver | 34 |
| Driving chip | 341 |
| Driving member | 343 |
| Reflector | 36 |
| Receiver | 50 |
| Photodiode | 52 |
| Receiving lens | 54 |
| Memory | 70 |
| Detection system | S1 |
| Central control module | 101 |
| Emission control module | 103 |
| Driving module | 105 |
| Receiver control module | 107 |
| Calculation module | 109 |
| Unmanned aerial vehicle | 200 |
| Device body | 22 |
| Driving member | 221 |
| Body | 2211 |
| Mounting portion | 2213 |
| Control device | 24 |
| Propulsion device | 26 |

Example embodiments of the present disclosure will be described below with reference to the drawings.

DETAILED DESCRIPTION OF THE DISCLOSURE

A better understanding of the disclosure will be obtained by reference to the following detailed description that sets forth illustrative embodiments with reference to the drawings. It will be apparent that the embodiments described herein are merely provided by way of example only. Those skilled in the art can conceive other embodiments in light of those embodiments disclosed herein without inventive efforts, and all these embodiments are within the scope of the disclosure.

It is apparent that, if a component is described as "being fixed to" another component, it can be directly fixed to the other component, or an intermediate component can be provided therebetween. If a component is described as "being coupled to" another component, it can be directly coupled to the other component, or an intermediate component can be provided therebetween. If a component is described as "being disposed on" another component, it can be disposed directly on the other component, or an intermediate component can be provided therebetween. Terms such as "vertical", "horizontal", "left", "right", as used in the disclosure, are merely illustrative.

Unless otherwise defined, technical and scientific terms, as used in the disclosure, have the same meaning as commonly understood by those skilled in the field of the disclosure. The terms as used in the disclosure are intended to illustrate the embodiments, not to limit the disclosure. The term "and/or", as used in the disclosure, comprises any and all combinations of one or more items as listed.

Illustrative embodiments of the disclosure are described with reference to the drawings. The embodiments and features can be combined with one another provided they are technically compatible.

Figure 1:
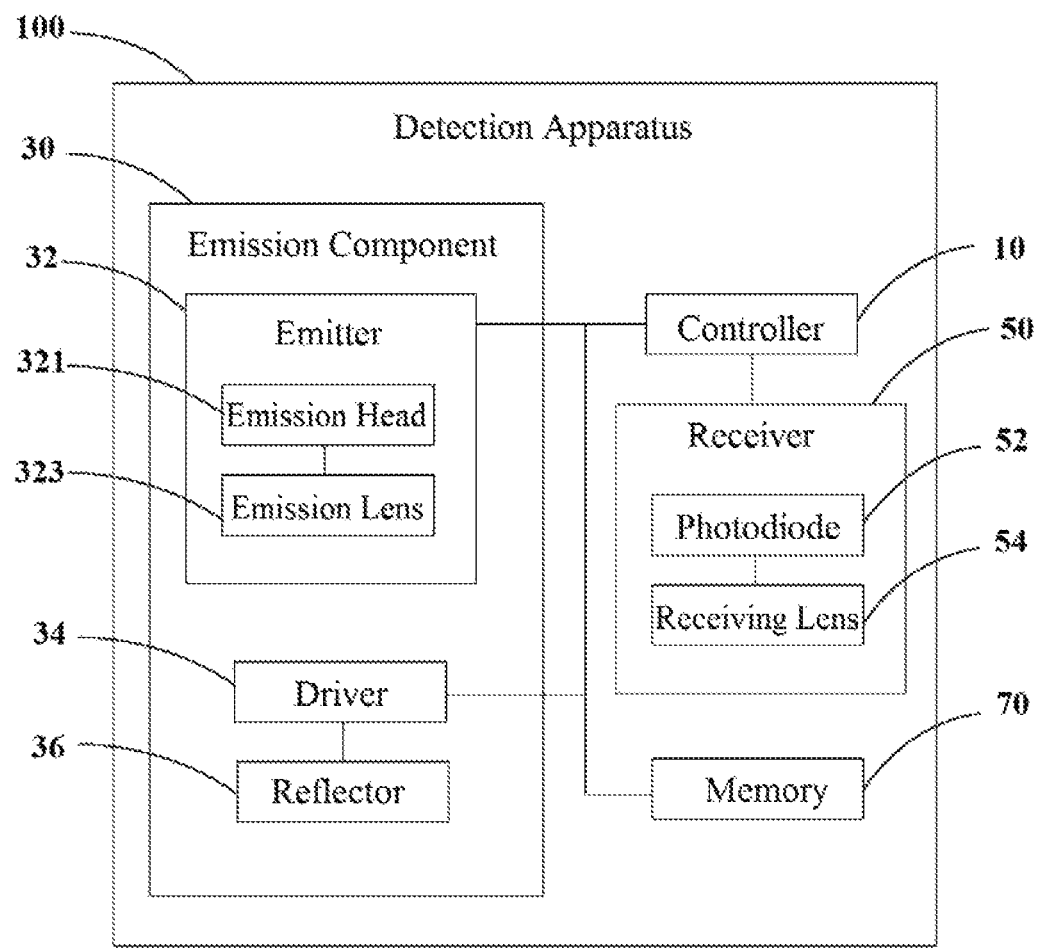
FIG. 1 shows element modules of a detection apparatus in accordance with an embodiment of the disclosure.

Referring to FIG. 1, an embodiment of the disclosure provides a detection apparatus 100. The detection apparatus 100 can detect an obstacle in surrounding environment and determine a position of the obstacle relative to the detection apparatus 100. The detection apparatus 100 can be used in a three-dimensional (3D) imaging system or a 3D modeling system. The detection apparatus 100 can construct a contour of the obstacle by detecting a relative position of each unit area of the obstacle, such that a 3D imaging or 3D modeling of an obstacle can be obtained. It will be appreciated that the detection apparatus 100 can be used in other scenarios including but not limited to space scene simulation, or automatic obstacle avoidance systems for UAVs and unmanned vehicles.

In some embodiments, the obstacle can be an object which obstructs a propagation of signals.

The detection apparatus 100 can comprise a controller 10, an emission component 30, and a receiver 50. In some embodiments, the emission component 30 and the receiver 50 can be electrically connected with the controller 10.

The controller 10 can control the emission component 30 to emit a signal. The signal can be reflected to the receiver 50 if it impinges against an obstacle. The receiver 50 can receive the reflected signal, convert the reflected signal into an electrical signal and transmit the electrical signal in the controller 10. The controller 10 can calculate a distance between the obstacle and the detection apparatus 100 based upon the electrical signal. In some instances, the emission component 30 can emit signals toward a plurality of directions, and the controller 10 can calculate distances between obstacles, which are provided in the plurality of directions around the detection apparatus 100, and the detection apparatus 100 based upon reflected signals.

The emission component 30 can comprise an emitter 32, a driver 34 and a reflector 36. In some embodiments, the emitter 32 and the driver 34 can be connected to the controller 10, and the reflector 36 can be connected to the driver 34. The emitter 32 can emit signal onto the reflector 36. The driver 34 can drive a movement of the reflector 36, such that the reflector 36 can emit signal toward a plurality of directions.

In some embodiments, the emitter 32 can be a laser emitter, and the signal emitted from the emitter 32 can be a laser signal. In some instances, the emitter 32 can comprise an emission head 321 and an emission lens 323 connected on the emission head 321. The emission head 321 can be a laser diode, and the emission lens 323 can be a collimating lens.

The laser diode can emit a laser signal. The laser signal can be directed to pass through the collimating lens so as to impose high collimation and stability to the laser signal.

It will be appreciated that, the emitter 32 is not limited to the one as particularly described in the illustrative embodiment. Any type of lighting source can be used as the emitter 32.

The driver 34 can be provided in proximity to the emitter 32 with a spacing therebetween. The driver 34 can drive a rotation of the reflector 36. In some embodiments, the driver 34 can be a micro-electro-mechanical system (MEMS) driver. A micro-actuator can be integrally provided in the driver 34. The driver 34 can drive the rotation of the reflector 36 using the micro-actuator.

The reflector 36 can be provided on the micro-actuator of the driver 34 to reflect the signal emitted by the emitter 32 toward a plurality of directions. In some embodiments, the reflector 36 can be a reflective mirror.

In some instances, the micro-actuator of the driver 34 can be a two-axis actuator capable of driving the reflector 36 to rotate about a first axis and a second axis. The second axis can be different from the first axis. In some embodiments, the second axis can be substantially perpendicular to the first axis.

It will be appreciated that, the second axis can be not perpendicular to the first axis. The second axis can intersect the first axis at any angle therebetween. For instance, the angle of intersection formed by the first axis and the second axis can be greater than or equal to 1°, 10°, 20°, 30°, 40°, 50°, 60°, 70° or 80°. Optionally, the angle of intersection formed by the first axis and the second axis can be less than or equal to 1°, 10°, 20°, 30°, 40°, 50°, 60°, 70°, 80° or 90°. Optionally, the angle of intersection formed by the first axis and the second axis can be a value falling within a range between any two of the values described herein.

It will be appreciated that, the driver 34 can drive the reflector 36 to rotate about the first axis by any angle. For instance, the driver 34 can drive the reflector 36 to rotate about the first axis by 30°, such that the reflector 36 can reflect the emitted signal from the emitter 32 in a range of 30° surrounding the detection apparatus 100 to obtain obstacle information within a range of 30° surrounding the detection apparatus 100. Optionally, the driver 34 can drive the reflector 36 to rotate about the first axis by 180°, such that the reflector 36 can reflect the emitted signal from the emitter 32 in a range of 180° surrounding the detection apparatus 100 to obtain obstacle information within a range of 180° surrounding the detection apparatus 100. Optionally, the driver 34 can drive the reflector 36 to rotate about the first axis by 360°, such that the reflector 36 can reflect the emitted signal from the emitter 32 in a range of 360° surrounding the detection apparatus 100 to obtain obstacle information within a range of 360° surrounding the detection apparatus 100.

It will be appreciated that, the driver 34 can drive the reflector 36 to rotate about the first axis at an angle greater than or equal to 1°, 10°, 30°, 60°, 90°, 120°, 150°, 180°, 210°, 240°, 270° or 360°. Optionally, the driver 34 can drive the reflector 36 to rotate about the first axis at an angle less than or equal to 10°, 30°, 60°, 90°, 120°, 150°, 180°, 210°, 240°, 270° or, 360°. Optionally, the driver 34 can drive the reflector 36 to rotate about the first axis at an angle falling within a range between any two of the values described herein.

The driver 34 can drive the reflector 36 in a similar manner to rotate about the second axis at an angle greater than or equal to 1°, 10°, 30°, 60°, 90°, 120°, 150°, 180°, 210°, 240°, 270° or 360°. Optionally, the driver 34 can drive the reflector 36 to rotate about the second axis at an angle less than or equal to 10°, 30°, 60°, 90°, 120°, 150°, 180°, 210°, 240°, 270° or 360°. Optionally, the driver 34 can drive the reflector 36 to rotate about the second axis at an angle falling within a range between any two of the values described herein.

The receiver 50 can be provided in proximity to the emission component 30. The receiver 50 can receive a reflected signal which is the emitted signal from the emission component 30 being reflected by an obstacle, and transmit the reflected signal to the controller 10 such that the controller 10 can calculate a position of the obstacle relative to the detection apparatus 100 based upon the reflected signal. In some embodiments, the receiver 50 can comprise a photodiode 52 and a receiving lens 54. The receiving lens 54 can be provided in proximity to the photodiode 52. The reflected signal can be first collimated by the receiving lens 54 and then impinge onto the photodiode 52. The photodiode 52 can convert the incident light into an electrical signal and transmit the electrical signal to the controller 10.

It will be appreciated that, the embodiment described hereinabove is merely illustrative and various variation can occur. In some instances, the emission lens 323 and the receiving lens 54 can be removed to lower a production cost. Optionally, the emission lens 323 or the receiving lens 54 can be removed.

Figure 2:
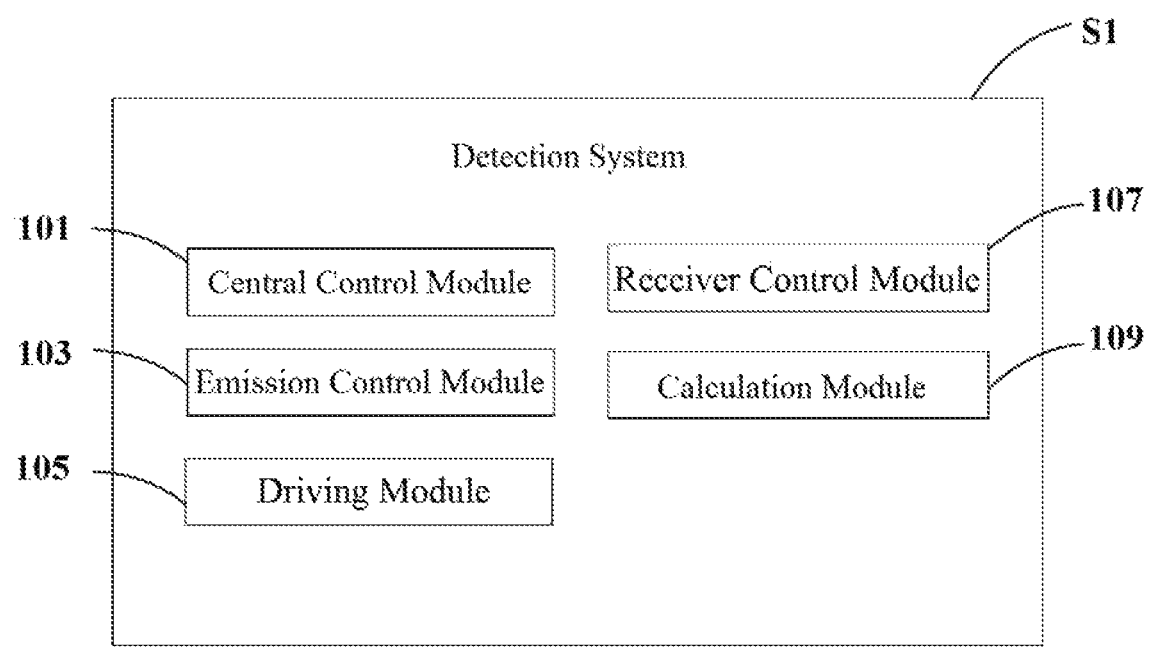
FIG. 2 shows functional modules of a detection system in accordance with an embodiment of the disclosure.

Referring to FIG. 2, an aspect of the disclosure provides a detection system S1. FIG. 2 shows functional modules of a detection system S1 in accordance with an embodiment of the disclosure. The detection system S1 can be implemented with the detection apparatus 100 as described hereinabove. In some embodiments, the detection system S1 can comprise a central control module 101, an emission control module 103, a driving module 105, a Receiver control module 107 and a calculation module 109. The detection apparatus 100 can further comprise a memory 70 (as shown in FIG. 1). Each module of the detection system S1 can be a programmable module stored in the memory 70 and executed by the controller 10.

In some embodiments, the central control module 101 can send instructions to other modules and direct the modules to collaboratively enable the detection apparatus 100 to detect surrounding obstacles.

The emission control module 103 can control the emission component 30 to emit a signal. In some instances, the emission control module 103 can control the emitter 32 of the emission component 30 to emit a signal toward the reflector 36. In some embodiments, the emitter 32 can be a laser emitter, and the signal can be a laser signal.

The driving module 105 can control the driver 34 of the emission component 30 to rotate the reflector 36, such that the reflector 36 can reflect the signal toward a plurality of directions around the detection apparatus 100.

The receiver control module 107 can determine whether there is a reflected signal based upon a state of the receiver 50. For instance, the emitted signal from the reflector 36 can be reflected back to the receiver 50 if it impinges onto an obstacle, and an electrical level in the photodiode 52 of the receiver 50 can thus be changed. The receiver control module 107 can determine whether there is a reflected signal based upon the state of the receiver 50.

In some embodiments, the signal emitted from the reflector 36 can be a laser signal. The photodiode 52 can receive a reflected laser signal from the obstacle if the laser signal impinging onto and being reflected by the obstacle, and convert the reflected laser signal into an electrical signal. For instance, the photodiode 52 is provided with a P-N junction (e.g., a P-type semiconductor and a N-type semiconductor are provided on a same semiconductor substrate, which is typically silicon or germanium substrate, and a space charge region referred to as the P-N junction is formed on an interface of the P-type semiconductor and a N-type semiconductor) and electrodes, where the P-N junction can receive an incident light, and the electrodes can generate a reverse voltage. If the photodiode 52 receives no incident light, the reverse current therein is small, for example less than 0.1 µA. If the photodiode 52 receives an incident light, energy-carrying photons, which carry energy, can enter into the P-N junction and where they transfer energy to the bound electrons in the covalent bonds. Some electrons can thus release from the covalent bonds, thereby generating electro-hole pairs (known as photo-generated carriers) are generated. The photo-generated carriers drift under the reverse voltage, such that the reverse current is significantly increased. An incident light having greater light intensity can generate a larger reverse current. The photodiode 52 can be electrically connected to the controller 10, an electrical signal which is generated by the reverse current can change in response to a change in the laser signal incident on the photodiode 52. Therefore, the receiver control module 107 can determine whether there is a reflected signal based upon a change in the electrical signal.

The calculation module 109 can calculate a position of the obstacle relative to the detection apparatus 100 based upon the reflected signal. In some instances, the reflected signal can be converted into an electrical signal by the photodiode 52 when being received by the receiver 50. The calculation module 109 can calculate the position of the obstacle relative to the detection apparatus 100 based upon a rotational angle of the reflector 36, a time of emitting the emitted signal and a time of receiving the reflected signal.

In some embodiments, the detection apparatus 100 can be used in obstacle detection. The emitter 32 can continuously emit signals toward the reflector 36; meanwhile, the driver 34 can direct the reflector 36 to rotate, such that the reflector 36 reflects the signals in a plurality of directions around the detection apparatus 100. If there's an obstacle within a surrounding environment of the detection apparatus 100, the signal impinging onto the obstacle can be reflected back to the receiver 50. The receiver 50 can convert the received signal, which is the reflected single from the obstacle, into an electrical signal and transmit electrical signal to the controller 10. The controller 10 can determine a direction to which the signal is emitted based upon a rotational angle of the reflector 36; therefore the direction of the obstacle can be determined. The controller 10 can calculate a distance between the obstacle and the detection apparatus 100 based upon a difference between the time of emitting the emitted signal and the time of receiving the reflected signal. To this end, the orientation and distance of the obstacle relative to the detection apparatus 100 can be determined.

It will be appreciated that, the detection apparatus 100 can be used in 3D imaging or 3D modeling. The detection apparatus 100 can construct a contour of an obstacle by detecting a relative position of each unit area of the obstacle, such that a 3D imaging or 3D modeling of the obstacle can be obtained. In some instances, the emitter 32 can continuously emit signals toward the reflector 36; meanwhile, the driver 34 can continuously direct the reflector 36 to rotate, such that the reflector 36 successively reflects the signals toward all directions within the surrounding environment of the detection apparatus 100. In the meantime, the controller 10 can record a reflection distance of signal in each direction, thereby obtaining a distance information between the obstacle and the detection apparatus 100 in each direction. As a result, the controller 10 can construct a contour of the surrounding environment of the detection apparatus 100 based upon the obstacle information in each unit direction within the surrounding environment of the detection apparatus 100, such that a 3D imaging or 3D modeling of the surrounding environment can be obtained. A plural of the detection apparatuses 100 can be collaboratively operated if there is a need to construct a 3D model of a larger space.

Figure 3:
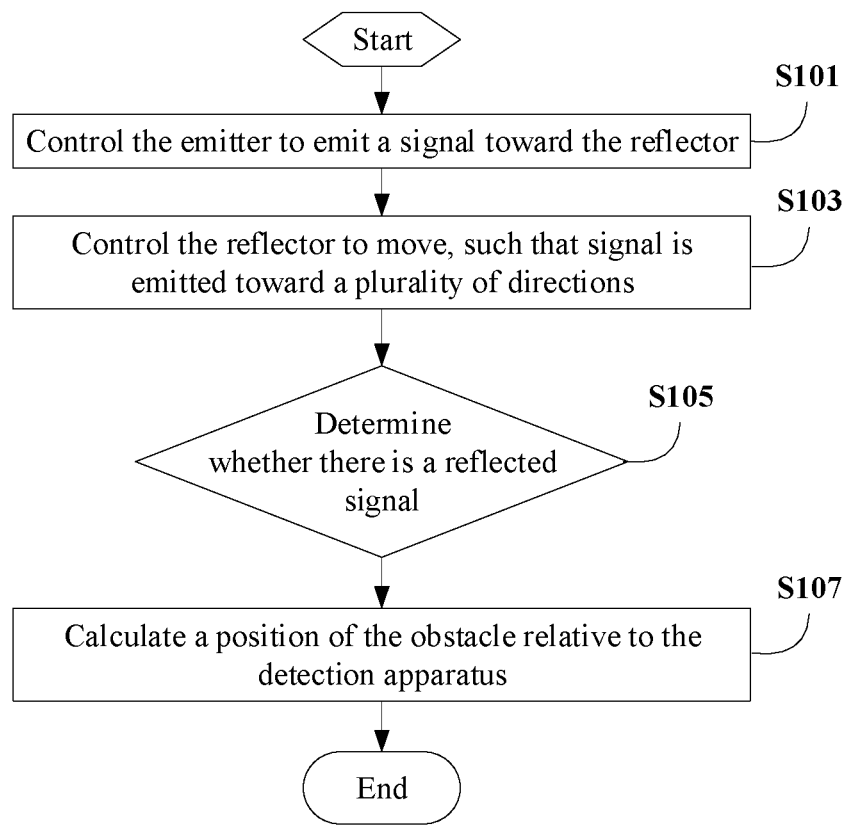
FIG. 3 shows a flowchart of a detection method in accordance with an embodiment of the disclosure.

Referring to FIG. 3, an aspect of the disclosure provides a detection method. FIG. 3 shows a flowchart of a detection method in accordance with an embodiment of the disclosure. The detection method can be performed by the detection system S1 and the detection apparatus 100. The detection method can comprise steps S101 to S107.

In step S101, the emission component 30 can be controlled to emit a signal. In some instances, the emission control module 103 can control the emitter 32 of the emission component 30 to emit a signal toward the reflector 36. In some embodiments, the emitter 32 can be a laser emitter, and the signal can be a laser signal.

In step S103, a movement of the reflector 36 can be controlled to reflect the signal in a plurality of directions around the detection apparatus 100. In some instances, the driving module 105 can control the driver 34 of the emission component 30 to drive a rotation of the reflector 36, such that the reflector 36 reflects the signal in the plurality of directions around the detection apparatus 100. For instance, the driving module 105 can control the driver 34 to drive the reflector 36 to rotate about the first axis by a predetermined angle, such that the signal is emitted within a predetermined environment around the direction about the first axis. Optionally, the driving module 105 can control the driver 34 to drive the reflector 36 to rotate about the second axis by a predetermined angle, such that the signal is emitted within a predetermined environment about the second axis. Optionally, the driving module 105 can control the driver 34 to drive the reflector 36 to rotate about both the first axis and the second axis, such that the signal is emitted to the surrounding environment of the detection apparatus 100.

In step S105, a determination is made on whether there is a reflected signal. The process can proceed to step S107 if a reflected signal is received at the receiver 50; otherwise, the process stays in step S105 to determine whether there is a reflected signal. In some instances, a signal which is emitted from the reflector 36 to the surrounding environment can be reflected back to the receiver 50 if it impinges onto an obstacle, and the receiver control module 107 can determine whether a signal is reflected back based upon a state of the receiver 50.

In step S107: a position of the obstacle relative to the detection apparatus 100 can be calculated. In some instances, the photodiode 52 can convert the reflected signal, which is received at the receiver 50, into an electrical signal. The calculation module 109 can calculate a position of the obstacle relative to the detection apparatus 100 based upon a rotational angle of the reflector 36, the electrical signal, a time of emitting the emitted signal and a time of receiving the reflected signal.

Figure 4:
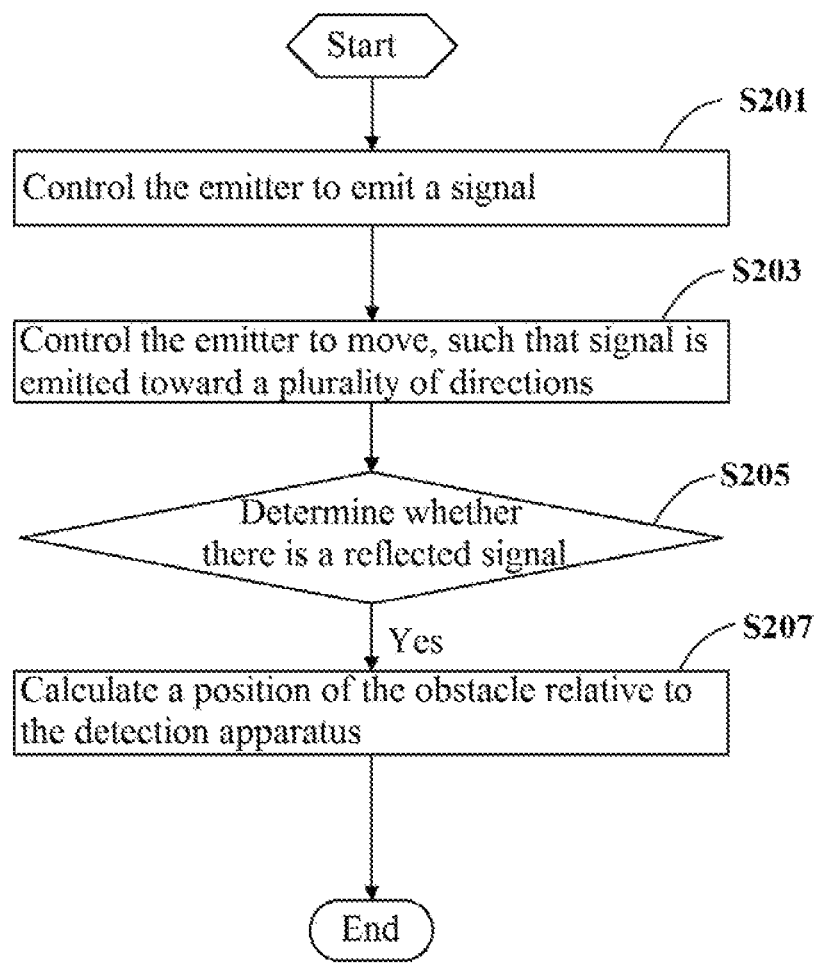
FIG. 4 shows a flowchart a detection method in accordance with another embodiment of the disclosure.

FIG. 4 shows a flowchart a detection method in accordance with another embodiment of the disclosure. The detection method can be performed by the detection system S1 and a detection apparatus which is substantially identical to the detection apparatus 100. In the illustrative embodiment, the reflector can be removed from the detection apparatus 100, and the emission head of the emitter of the detection apparatus can be disposed on a micro-actuator of the driver, such that the driver can drive the emitter to rotate about the first axis and/or the second axis by a predetermined angle to emit a signal within a predetermined environment of the detection apparatus. The detection method can comprise steps S201 to S207.

In step S201, the emission component 30 can be controlled to emit a signal. In some instances, the emission control module 103 can control the emitter 32 of the emission component 30 to emit a signal. In some embodiments, the emitter 32 can be a laser emitter, and the signal can be a laser signal.

In step S203: in the meanwhile, a movement of the emitter 32 can be controlled to emit signal in a plurality of directions around the detection apparatus 100. In some instances, the driving module 105 can control the driver 34 of the emission component 30 to drive a rotation of the emitter 32, such that the emitter 32 emits signal in the plurality of directions around the detection apparatus 100. For instance, the driving module 105 can control the driver 34 to drive the emitter 32 to rotate about the first axis by a predetermined angle, such that signal is emitted within a predetermined environment about the first axis. Optionally, the driving module 105 can control the driver 34 to drive the emitter 32 to rotate about the second axis by a predetermined angle, such that signal is emitted within a predetermined environment about the second axis. Optionally, the driving module 105 can control the driver 34 to drive the emitter 32 to rotate about both the first axis and the second axis, such that signal is emitted to the surrounding environment of the detection apparatus 100.

In step S205, a determination is made on whether there is a reflected signal. The process can proceed to step S207 if a reflected signal is received at the receiver 50; otherwise, the process stays in step S105 to determine whether there is a reflected signal. In some instances, a signal which is emitted from the emitter 32 to the surrounding environment can be reflected back to the receiver 50 if it impinges onto an obstacle, and the receiver control module 107 can determine whether a signal is reflected back based upon a state of the receiver 50.

In step S207, a position of the obstacle relative to the detection apparatus 100 can be calculated. In some instances, the photodiode 52 can convert the reflected signal, which is received at the receiver 50, into an electrical signal. The calculation module 109 can calculate a position of the obstacle relative to the detection apparatus 100 based upon a rotational angle of the emitter 32, the electrical signal, a time of emitting the emitted signal and a time of receiving the reflected signal.

The detection apparatus 100 and the detection system S1 as disclosed in the disclosure can be applied in obstacle detection for UAVs.

Figure 5:
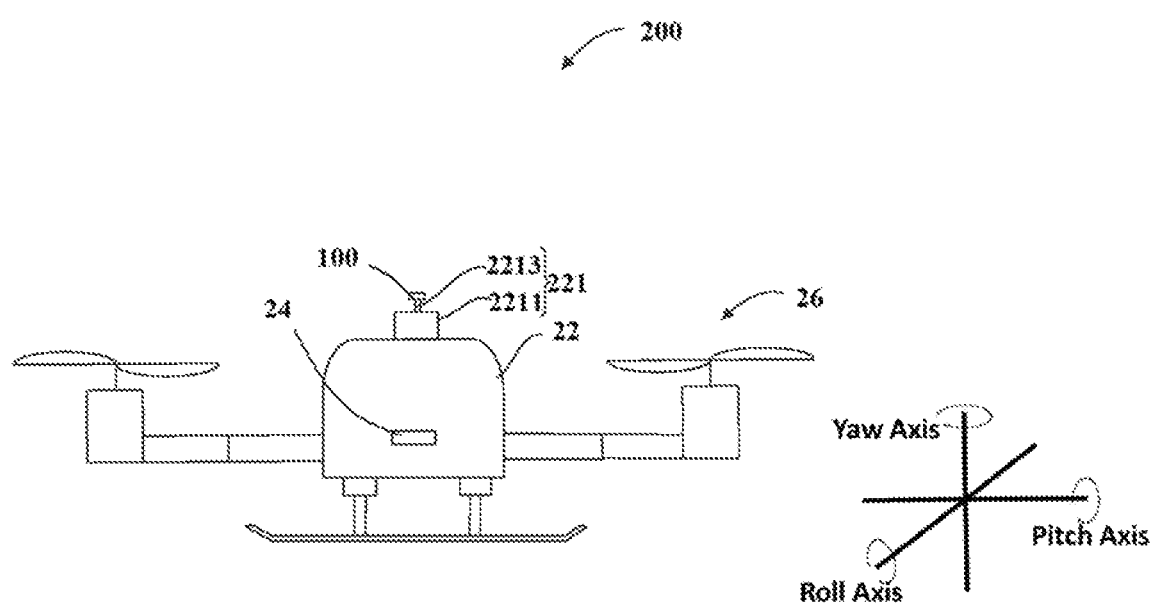
FIG. 5 shows an unmanned aerial vehicle (UAV) in accordance with an embodiment of the disclosure.

Referring to FIG. 5, an aspect of the disclosure provides a UAV 200. The UAV 200 can comprise a device body 22, a control device 24, a propulsion device 26, and the detection apparatus 100 as described in this disclosure. In some embodiments, the control device 24, the propulsion device 26 and the detection apparatus 100 can be provided on the device body 22.

The control device 24 can control an operation of the UAV 200. The propulsion device 26 can provide power for propelling the UAV 200. The detection apparatus 100 can be provided with the detection system S1 which can direct the detection apparatus 100 to detect obstacle information in the surrounding environment of the UAV 200 and transmit the detected obstacle information to the control device 24. The control device 24 can control an operation of the propulsion device 26 based upon the obstacle information to enable the UAV 200 to avoid obstacles.

The device body 22 can be provided with a driving member 221. The driving member can support the detection apparatus 100. In some embodiments, the driving member 221 can be a motor. The driving member 221 can comprise a body 2211 and a mounting portion 2213. In some embodiments, the body 2211 can be disposed on the device body 22, and the mounting portion 2213 can be disposed on the body 2211 and can be driven by the control device 24 to rotate about a third axis with respect to the body 2211. The mounting portion 2213 can carry the detection apparatus 100. The third axis can be substantially perpendicular to the first axis and the second axis when the detection apparatus 100 is mounted on the mounting portion 2213. In other words, the first axis, the second axis and the third axis can be disposed substantially orthogonal to one another.

When the UAV 200 detects obstacles in surrounding environment using the detection apparatus 100, the driving member 221 can drive the detection apparatus 100 to rotate about the third axis, such that the emission component 30 scans and emits signal toward surrounding environment around the third axis. In the meantime, the driver 34 of the detection apparatus 100 can drive the reflector 36 to rotate about the first axis and/or the second axis, such that the emission component 30 scans and emits signal toward surrounding environment around the UAV 200.

In some instances, the third axis can be a yaw axis of the UAV 200, the second axis can be a pitch axis of the UAV 200, and the first axis can be a roll axis of the UAV 200.

In the detection apparatus 100 of the disclosure, the reflector 36 can be driven by the driver 34 to rotate, such that signal from the emitter 32 can be emitted toward a plurality of directions around the detection apparatus 100. Therefore, a detecting range of the detection apparatus 100 is wide.

In the detection apparatus 100 of the disclosure, a MEMS driver can be utilized as the driver 34 to drive the rotation of the reflector 36. The MEMS driver has a small size and high precision, therefore the detection apparatus 100 has a high detecting precision and small size. The detection apparatus 100 is flexible in sense of mounting and can be installed or carried on the UAV 200.

It will be appreciated that, the driving member 221 can be removed and the detection apparatus 100 can be provided directly on the device body 22.

It will be appreciated that, the reflector 26 can be removed and the emitter 32 can be directly connected to the driver 34, such that the emission head 321 of the emitter 32 can be disposed on the micro-actuator of the driver 34. The driver 34 can drive the emitter 32 to rotate about the first axis and/or the second axis by a predetermined angle so as to emit the signal within a predetermined surrounding environment of the detection apparatus 100.

It will be appreciated that, if obstacle in a particular direction is to be detected by the detection apparatus 100, the driver 34 can drive the reflector 36 to rotate only about the first axis or the second axis. Optionally, if obstacle in a particular direction is to be detected by the detection apparatus 100, the driving member 221 can drive the detection apparatus 100 to rotate about the third axis while the driver 34 does not drive a rotation of the reflector 36.

It will be appreciated that, the micro-actuator of the driver 34 can be an actuator other than a two-axis actuator. For instance, the micro-actuator of the driver 34 can be a three-axis actuator, four-axis actuator, five-axis actuator or multi-axis actuator. If the micro-actuator of the driver 34 is a three-axis actuator, the micro-actuator of the driver 34 can drive the reflector 36 to rotate about the first axis, the second axis and a third axis which is different from the first axis and the second axis. The first axis, the second axis and the third axis can intersect with one another. In some instances, the first axis, the second axis and the third axis can be provided orthogonal to one another.

It will be appreciated that, the detection apparatus 100 and the detection system S1 can be used in a 3D imaging system, a 3D modeling system or a space scene simulation system in addition to an automatic obstacle avoidance system. In some instances, the detection apparatus 100 and the detection system S2 can be used in a positioning system.

In some instances, the UAV 200 can be provided with an inertial measurement system and an autonomous positioning system. The inertial measurement system can detect a current movement state and a flight attitude of the UAV 200. The autonomous positioning system can implement an autonomous positioning of the UAV 200. The UAV 200 can construct a simulated surrounding environment if relative position of obstacles within the surrounding environment of the UAV 200 are detected using the detection apparatus 100. The application of the detection apparatus 100 in 3D modeling is described hereinabove. After the UAV 200 obtains position of the obstacles relative to the detection apparatus 100, the autonomous positioning system can determine a spatial position of the UAV 200 within the simulated surrounding environment and thereby implement an autonomous positioning using SLAM (simultaneous localization and mapping) algorithm in combination with current flight attitude of the UAV 200 measured by the inertial measurement system.

It will be appreciated that, the detection apparatus 100 can be provided at any position of the UAV 200. For instance, the detection apparatus 100 can be provided on an upper surface, a lower surface or side surface of the device body 22. Optionally, the detection apparatus 100 can be provided on the propulsion device. It will be appreciated that, the UAV 200 can be provided with a plurality of detection apparatuses 100 to scan and detect obstacles within a larger environment.

It will be appreciated that, the calculation module 109 can calculate a distance between the obstacle and the detection apparatus 100 using the method as described hereinabove in which the distance between the obstacle and the detection apparatus 100 is determined from a difference between a time of emitting the emitted signal and a time of receiving a reflected signal (e.g., a pulse ranging method). The distance can be determined using other methods. In some instances, the calculation module 109 can measure and calculate the distance between the obstacle and the detection apparatus 100 by a phase method.

In some instances, the detection apparatus 100 can comprise a modulator (not shown in the drawings). The modulator can modulate an amplitude of the signal emitted from the emitter 32 using a radio frequency, so as to generate a modulated signal. The reflector 36 can emit the modulated signal toward the surrounding environment of the detection apparatus 100. The modulator can also measure a phase difference between the emitted signal and reflected signal when the receiver 50 receives a reflected signal which is the modulated signal being reflected by an obstacle. The calculation module 109 can calculate a distance, which corresponds to the phase difference, based upon a wavelength of the modulated signal and the phase difference, such that the distance between the obstacle and the detection apparatus 100 can be calculated.

In some embodiments of the disclosure, the UAV 200 can be a rotor aircraft which perform aerial photography by carrying an imaging device such as a camera or a video camera. It will be appreciated that, the UAV 200 can also be used in applications including ground mapping, disaster investigation and rescue, surveillance, power transmission line inspection. It will be appreciated that, the UAV 200 can be a fixed-wing aircraft.

It will be appreciated that, in addition to the application in UAV, the detection apparatus 100 and the detection system S1 can also be used in automatic obstacle avoidance systems in other movable devices or remotely controlled movable devices such as unmanned vehicles, unmanned watercrafts.

The foregoing embodiments are intended to merely illustrate rather than limit the disclosure. While some embodiments of the disclosure have been shown and described herein, it will be obvious to those skilled in the art that such embodiments are provided by way of example only. Numerous variations and substitutions will occur to those skilled in the art without departing from the scope of the disclosure.

What is claimed is:

1. A detection apparatus comprising:
   an emission component comprising:
      an emitter configured to emit a signal;
      a reflector disposed in proximity to the emitter and configured to reflect the signal emitted by the emitter; and
      a driver connected to the reflector;
   a controller electrically connected with the emission component and configured to control the driver to drive the reflector to rotate with respect to the emitter to emit the signal to different directions; and
   a receiver electrically connected with the controller and configured to receive a reflected signal from an obstacle, the receiver including:
      a photodiode configured to receive a reflected signal and convert the reflected signal into an electrical signal; and
      a receiving lens including a collimating lens disposed over the photodiode;
   wherein:
      the reflected light passes through the collimating lens and then directly impinges onto the photodiode;
      the detection apparatus is mounted to a device body of a movable device via a driving member, the driving member being disposed at the device body, and the movable device including a propulsion device extending from the device body and configured to provide power for propelling the movable device;
      the driver is configured to drive the reflector to rotate with respect to the emitter around a roll axis of the movable device and a pitch axis of the movable device;
      the driving member is configured to drive the detection apparatus to rotate around a yaw axis of the movable device;
      in response to the obstacle being in a first direction range, the driving member is configured to drive the detection apparatus to rotate around the yaw axis of the movable device while the driver of the emission component is configured to not to drive the reflector to rotate; and
      in response to the obstacle being in a second direction range, the driver of the emission component is configured to drive the reflector to rotate about the roll axis of the movable device or the pitch axis of the movable device.

2. The detection apparatus of claim 1, wherein the emitter comprises a laser emitter and the signal comprises a laser signal.

3. The detection apparatus of claim 1, wherein the emitter comprises an emission head.

4. The detection apparatus of claim 3, wherein the emitter further comprises an emission lens connected to the emission head.

5. The detection apparatus of claim 4, wherein the emission head comprises a laser emission head and the emission lens comprises a collimating lens.

6. The detection apparatus of claim 1, wherein the driver comprises a micro-electro-mechanical system (MEMS) driver.

7. The detection apparatus of claim 1, further comprising:
   a modulator configured to perform an amplitude modulation on the signal emitted by the emitter.

8. The detection apparatus of claim 1, wherein the detection apparatus is mounted to an upper surface of the device body of the movable device via the driving member.

9. A movable device comprising:
   a device body;
   a control device carried by the device body and configured to control an operation of the movable device;
   a propulsion device extending from the device body and configured to provide power for propelling the movable device;
   a driving member disposed at the device body; and
   a detection apparatus mounted to the device body via the driving member, the detection apparatus comprising:
      an emission component comprising:
         an emitter configured to emit a signal;
         a reflector disposed in proximity to the emitter and configured to reflect the signal emitted by the emitter; and
         a driver connected to the reflector and configured to drive the reflector to rotate with respect to the emitter around a roll axis of the movable device and a pitch axis of the movable device, to emit the signal to different directions; and
      a receiver configured to receive a reflected signal from an obstacle, the receiver including:
         a photodiode configured to receive a reflected signal and convert the reflected signal into an electrical signal; and
         a receiving lens including a collimating lens disposed over the photodiode;
   wherein:
      the driving member is configured to drive the detection apparatus to rotate around a yaw axis of the movable device;
      the reflected light passes through the collimating lens and then directly impinges onto the photodiode; and
      the control device is further configured to:
         in response to the obstacle being in a first direction range, control the driving member to drive the detection apparatus to rotate around the yaw axis of the movable device while controlling the driver of the emission component not to drive the reflector to rotate; and
         in response to the obstacle being in a second direction range, control the driver of the emission component to drive the reflector to rotate about the roll axis of the movable device or the pitch axis of the movable device.

10. The movable device of claim 9, wherein the emitter comprises a laser emitter and the signal comprises a laser signal.

11. The movable device of claim 9, wherein the emitter comprises an emission head.

12. The movable device of claim 11, wherein the emitter further comprises an emission lens connected to the emission head.

13. The movable device of claim 12, wherein the emission head comprises a laser emission head and the emission lens comprises a collimating lens.

14. The movable device of claim 9, wherein the driver comprises a micro-electro-mechanical system (MEMS) driver.

15. The movable device of claim 9, wherein the detection apparatus further comprises:
a modulator configured to perform an amplitude modulation on the signal emitted by the emitter.

16. A movable device comprising:
a device body;
a control device carried by the device body and configured to control an operation of the movable device;
a propulsion device extending from the device body and configured to provide power for propelling the movable device;
a driving member disposed at the device body; and
a detection apparatus mounted to the device body via the driving member, the detection apparatus including:
an emission component comprising:
an emitter configured to emit a signal;
a reflector disposed in proximity to the emitter and configured to reflect the signal emitted by the emitter; and
a driver connected to the reflector and configured to drive the reflector to rotate; and
a receiver configured to receive a reflected signal from an obstacle;
wherein the control device is further configured to:
in response to the obstacle being in a first direction range, control the driver of the emission component to drive the reflector to rotate about a first axis of the movable device or a second axis of the movable device; and
in response to the obstacle being in a second direction range, control the driving member to drive the detection apparatus to rotate around a third axis of the movable device while controlling the driver of the emission component not to drive the reflector to rotate.

* * * * *